United States Patent
Jeandin et al.

(10) Patent No.: US 11,284,675 B2
(45) Date of Patent: Mar. 29, 2022

(54) METHOD OF MANUFACTURING A FULLY FORMED UPPER

(71) Applicant: adidas AG, Herzogenaurach (DE)

(72) Inventors: Eric Jeandin, Nuremberg (DE); Ulrich Bauer, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 359 days.

(21) Appl. No.: 15/833,378

(22) Filed: Dec. 6, 2017

(65) Prior Publication Data

US 2018/0153265 A1 Jun. 7, 2018

(30) Foreign Application Priority Data

Dec. 6, 2016 (DE) .......................... 102016224240.7

(51) Int. Cl.
| | |
|---|---|
| *A43D 3/02* | (2006.01) |
| *B29D 35/12* | (2010.01) |
| *A43D 25/07* | (2006.01) |
| *A43B 23/02* | (2006.01) |
| *A43B 23/04* | (2006.01) |
| *A43D 13/00* | (2006.01) |

(Continued)

(52) U.S. Cl.
CPC ............ *A43D 3/02* (2013.01); *A43B 23/0215* (2013.01); *A43B 23/042* (2013.01); *A43D 13/00* (2013.01); *A43D 25/047* (2013.01); *A43D 25/07* (2013.01); *A43D 87/00* (2013.01); *B29D 35/126* (2013.01); *B29D 35/128* (2013.01); *A43D 2200/50* (2013.01)

(58) Field of Classification Search
CPC .............................. A43D 3/02; A43D 25/047
See application file for complete search history.

(56) References Cited

U.S. PATENT DOCUMENTS

| | | | |
|---|---|---|---|
| 2,330,260 A | 9/1943 | Baxter | |
| 2,540,217 A * | 2/1951 | Senfleben | ................ A43D 3/02 12/124 |

(Continued)

FOREIGN PATENT DOCUMENTS

| | | |
|---|---|---|
| DE | 1947025 | 9/1966 |
| DE | 2030088 | 2/1971 |

(Continued)

OTHER PUBLICATIONS

Japanese Patent Application No. 2017-233032, Decision of Refusal, dated Feb. 4, 2020, 6 pages (machine English translation provided).

(Continued)

*Primary Examiner* — Niki Bakhtiari
*Assistant Examiner* — Nicholas J Chidiac
(74) *Attorney, Agent, or Firm* — Kilpatrick Townsend & Stockton LLP

(57) ABSTRACT

Described is a method of manufacturing a component for a shoe that includes the steps: forming a sheet of material; heating the sheet of material; stretching the heated sheet of material by moving a last into the sheet of material, wherein the last defines the shape of the component; and applying a pressure lower than ambient pressure between the stretched sheet of material and the last to conform the sheet of material to the last; or applying a pressure higher than ambient pressure over the stretched sheet of material to conform the sheet of material to the last.

16 Claims, 7 Drawing Sheets

(51) Int. Cl.
*A43D 25/047* (2006.01)
*A43D 87/00* (2006.01)

(56) References Cited

U.S. PATENT DOCUMENTS

| | | | | |
|---|---|---|---|---|
| 3,064,111 | A * | 11/1962 | Newman | B26F 3/12 |
| | | | | 219/221 |
| 3,525,110 | A * | 8/1970 | Rubico | A43D 3/022 |
| | | | | 12/145 |
| 3,641,603 | A * | 2/1972 | Lockwood | A43D 8/006 |
| | | | | 12/146 C |
| 3,720,971 | A * | 3/1973 | Wyness | A43D 8/006 |
| | | | | 12/146 C |
| 7,178,267 | B2 | 2/2007 | Skaja et al. | |
| 9,259,877 | B2 | 2/2016 | Fisher et al. | |
| 2002/0012784 | A1 | 1/2002 | Norton et al. | |
| 2014/0223671 | A1 | 8/2014 | Fisher et al. | |
| 2014/0237738 | A1 * | 8/2014 | Johnson | B29D 35/126 |
| | | | | 12/107 R |
| 2014/0239556 | A1 | 8/2014 | Fisher et al. | |
| 2015/0305448 | A1 * | 10/2015 | Cavaliere | B29C 51/06 |
| | | | | 12/145 |
| 2016/0031164 | A1 * | 2/2016 | Downs | B29C 70/542 |
| | | | | 428/12 |
| 2016/0166011 | A1 * | 6/2016 | Bruce | A43D 1/025 |
| | | | | 12/51 |
| 2016/0206046 | A1 | 7/2016 | Cross | |
| 2016/0242510 | A1 | 8/2016 | Fisher et al. | |
| 2018/0014609 | A1 * | 1/2018 | Bruce | A43B 23/0205 |

FOREIGN PATENT DOCUMENTS

| | | | | |
|---|---|---|---|---|
| DE | 1951212 | | 5/1971 | |
| DE | 2053601 | | 5/1971 | |
| DE | 2056910 | | 5/1971 | |
| DE | 7134386 | | 7/1973 | |
| DE | 3937106 | | 5/1991 | |
| DE | 10217661 | | 11/2003 | |
| GB | 1454518 | A * | 11/1976 | A43D 3/022 |
| JP | S372737 | B | 5/1962 | |
| JP | S4939616 | B | 10/1974 | |
| JP | S54103153 | A | 7/1979 | |
| JP | S54103153 | A * | 8/1979 | A43D 25/06 |
| JP | H0838214 | A | 2/1996 | |
| JP | 2016523161 | A | 8/2016 | |
| WO | 2016107990 | | 7/2016 | |

OTHER PUBLICATIONS

Japanese Patent Application No. 2017-233032, Office Action dated Jan. 29, 2019, 11 pages (English translation submitted).
German Patent Application No. 102016224240.7, Office Action dated Jun. 30, 2017, 7 pages (No English translation available. A summary of the Office Action is provided in the Transmittal Letter submitted herewith).
European Patent Application No. 17204332.5, Extended Search Report dated Mar. 27, 2018, 8 pages.
European Patent Application No. 17204332.5, Office Action dated Apr. 29, 2019, 6 pages.
Japanese Application No. 2017-233032, Office Action dated Jul. 30, 2019, 10 pages (5 pages of English translation and 5 pages of Original translation).
German Application No. 102016224240.7, Office Action dated Aug. 6, 2019, 15 pages (6 pages of English translation and 4 page Original document).
Chinese Application No. 201711266706, Office Action dated Sep. 27, 2019, 25 pages (14 pages of English Translation and 11 pages of Original document).
Chinese Patent Application No. 201711266706, Office Action dated Jun. 2, 2020, 30 pages (English machine translation provided).
Besching, "Handbook for the Shoe Industry", Heidelberg: Dr. Alfred Hughig Verlag GmbH, 1990, 4 pages (No English translation available).
European Patent Application No. 17204332.5, Notice of Opposition filed Jul. 5, 2021, 40 pages.
Schlachter, "Shoe, Leather and Shoe Accessories", Cologne-Porz: H. Stamm Gmbh, 1981, 4 pages (No English translation available).
Wikipedia , "Last", available at https://de.wikipedia.org/wiki/Leisten, Feb. 27, 2016, 6 pages (English machine translation provided).

* cited by examiner

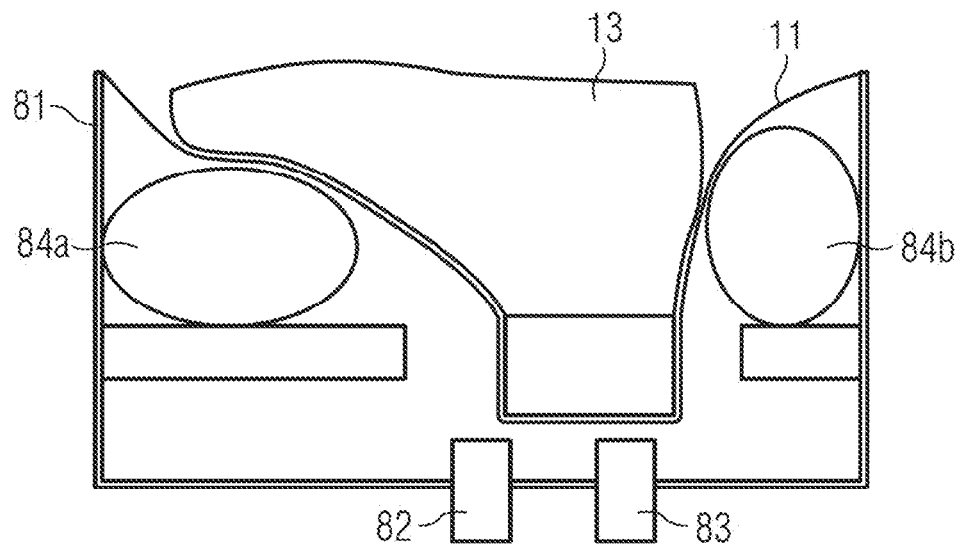
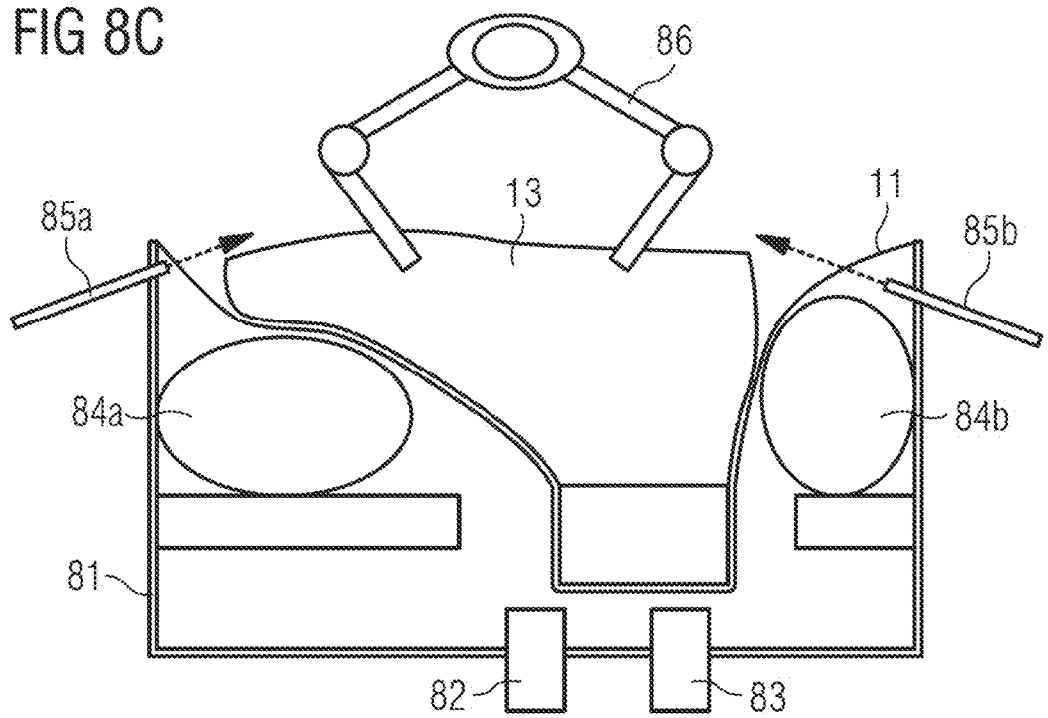

METHOD OF MANUFACTURING A FULLY FORMED UPPER

CROSS REFERENCE TO RELATED APPLICATION

This application is related to and claims priority benefits from German Patent Application No. DE 10 2016 224 240.7, filed on Dec. 6, 2016, entitled METHOD OF MANUFACTURING A FULLY FORMED UPPER ("the '240.7 application"). The '240.7 application is hereby incorporated herein in its entirety by this reference.

FIELD OF THE INVENTION

The present invention relates to a method of manufacturing a fully ed upper.

BACKGROUND

A shoe is usually made from several components to provide the shoe with a three-dimensional shape. For example, the shoe upper may be made from several distinct parts which are joined e.g. by gluing, stitching or welding. While each of these parts basically comprises a flat, two-dimensional shape, suitably joining the components yields an upper with a three-dimensional shape.

It is also known to form footwear components in a three-dimensional mold. For example, U.S. Pat. No. 7,178,267 B2 discloses footwear and footwear structures as well as methods for forming composite components for footwear or footwear structures. In forming the structures, two material layers are overlaid such that the two material layers are in contact with one another.

According to DE 102 17 661 A1, a method of manufacturing an insole or sole from thermoplastic sheet material is described in which a blank is pre-heated to plasticizing temperature and placed on a last of a molding apparatus. A forming mat clamped in a frame is drawn down over the last and pulls the mat tangentially around the upper side of the last until the frame sits on a table. A chamber between the table, last and mat is evacuated to form the mat closely against the last.

According to U.S. Pat. No. 9,259,877, a flexible manufacturing system may be used to fuse different layers of material together to form an article of footwear. The system includes a base portion, an intermediate member and an upper member. The intermediate member includes a flexible membrane. The intermediate member may be sealed with the base portion and a vacuum may be provided to pull the flexible membrane over layers of material placed on the base portion.

U.S. Pat. No. 3,720,971 relates to vacuum and pressure forming techniques for conforming initially flat material to a molding surface. The molding surfaces may be of a shape whereby the preformed upper is convertible to the shape of the last merely by a bending operation. The mold shape may be arrived at by forming a sheet of resiliently bendable material such as unplasticized PVC to the last shape required to form a shell and, after removing the shell from the last, partially flattening it by spreading outwardly the opposite sides.

However, the methods known in the prior art have the disadvantage that only relatively small parts for shoes may be formed or cannot be formed to their final shape. For example, according to some methods it is not possible to fully form an entire upper for a shoe because the pressures used are too low. Furthermore, especially when mats or membranes are used, the material layers or sheets tend to form wrinkles when drawn by the vacuum which is not only an aesthetical problem, but may cause cracks in the final component due to an uneven distribution of material. Also, mats or membranes cause additional manufacturing steps as well as additional machine parts which need to be serviced.

It is therefore, the objective of the present invention to provide a method of manufacturing a component for a shoe, in particular a fully formed shoe upper, which at least partly overcomes the above-mentioned deficiencies.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method of manufacturing a component for a shoe comprises the steps of: heating a sheet of material; stretching the heated sheet of material by moving a last into the sheet of material, wherein the last defines a shape of the component; and applying at least one of a pressure lower than ambient pressure between the stretched sheet of material and the last to conform the sheet of material to the last and a pressure higher than ambient pressure over the stretched sheet of material to conform the sheet of material to the last.

In certain embodiments, the component is a fully formed shoe upper.

In some embodiments, the method further comprises a step of fixing the sheet of material in a frame prior to heating the sheet of material.

The sheet of material, in some embodiments, is fixed in the frame substantially without tension.

In certain embodiments, the step of stretching the heated sheet of material comprises decreasing a distance between the frame and the last.

The last, in certain embodiments, is secured to a vacuum plate.

In some embodiments, the step of stretching the heated sheet of material comprises stretching at least a portion of the sheet of material by about 30%.

In certain embodiments, the step of stretching the heated sheet of material comprises controlling the stretch during stretching.

In some embodiments, the method further comprises a step of cooling down the component.

The component, in some embodiments, is a portion of an upper for a shoe.

In certain embodiments, the method further comprises a step of placing an insole board below the last.

In some embodiments, the insole board is placed below the last before the step of stretching the heated sheet of material.

In certain embodiments, the method further comprises a step of bonding the insole board to the portion of the upper.

In some embodiments, the method further comprises of applying an adhesive to the insole board and bonding the insole board to the portion of the upper by means of the adhesive.

Bonding the insole board to the portion of the upper, in certain embodiments, further comprises a step of clamping the insole board and the portion of the upper between the last and a vacuum plate.

In some embodiments, the method further comprises a step of removing an excess material from the component by using at least one of a heated cable, an oscillating knife, and a laser.

In certain embodiments, the method the steps of: forming at least one aperture in the component to remove the last; and deconstructing the last to fit through the aperture.

In some embodiments, the method further comprises a step of applying a pressure higher than ambient pressure over the stretched sheet of material by at least one of a heated gas and a non-heated gas.

The gas, in certain embodiments, comes into contact with the stretched sheet of material.

In certain embodiments, the step of applying a pressure higher than ambient pressure over the stretched sheet of material comprises inflating at least one bladder such that it comes into contact with at least a portion of the stretched sheet of material.

BRIEF DESCRIPTION OF THE DRAWINGS

In the following detailed description, embodiments of the invention are described referring to the following figures:

FIGS. 8A, 8B, 8C are diagrams illustrating a method of applying a pressure higher than ambient pressure over a stretched sheet of material to conform the sheet to a last according to certain embodiments of the present invention.

BRIEF DESCRIPTION

Figure 1A:
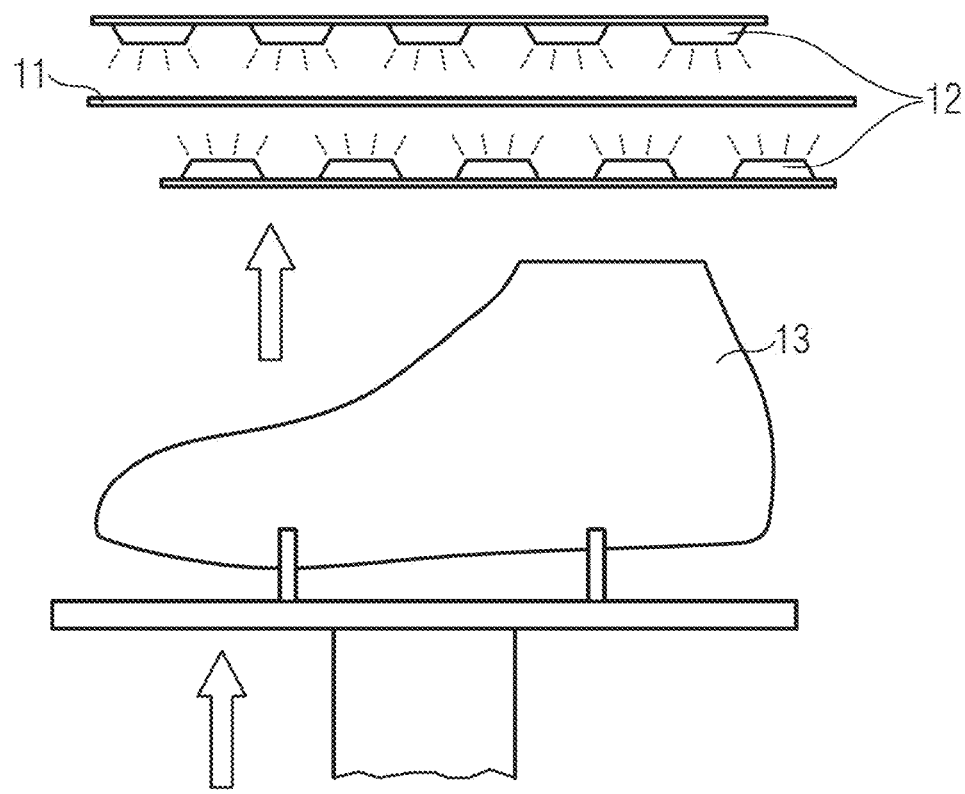
FIGS. 1A and 1B are diagrams illustrating a method of conforming a sheet to a last according to certain embodiments of the present invention.

The objective mentioned above is at least partly solved by a method of manufacturing a component for a shoe comprising the steps: (a.) providing a sheet of material; (b.) heating the sheet of material; (c.) stretching the heated sheet of material by moving a last into the sheet of material, wherein the last defines the shape of the component; and (d.) applying a pressure lower than ambient pressure between the stretched sheet of material and the last to conform the sheet of material to the last; or (e.) applying a pressure higher than ambient pressure over the stretched sheet of material to conform the sheet of material to the last.

According to the method of the present invention, a sheet of material is first heated and then stretched by moving a last defining the shape of the component into the sheet of material. In this way, the sheet of material is stretched and preliminarily conformed to the shape of the last, before a vacuum is applied to finally conform the sheet of material to the last.

The benefit of the present invention is a reduction of processing steps and machine components for manufacturing a component for a shoe. Rather than using a sequence of single steps, like cutting, forming, stitching, etc., the component may be formed around a last in a single processing step. By stretching the material over the last, the material may be completely formed around the last to make a large component, e.g. a fully-formed upper.

Furthermore, the inventors have realized, that in particular the step of stretching the heated sheet of material decreases the formation of wrinkles in the subsequent step of conforming the sheet of material to the last by the vacuum. This is also due to the fact that a mat or membrane is not needed.

Two alternative steps are provided according to the invention in order to conform the sheet of material to the last. According to the first alternative, a pressure lower than ambient pressure is applied between the stretched sheet of material and the last (method step d.). According to the second alternative, a pressure higher than ambient pressure is applied over the stretched sheet of material (method step e.). It should be noted that these alternatives may be performed exclusively, i.e. either step d. is performed or step e. is performed. Alternatively, both method steps may be performed, i.e. method step d. is performed and method step e. is performed. In the latter case, both alternatives may be performed simultaneously, i.e. at the same time, or subsequently, i.e. either step d. first, then step e., or step e. first, then step d.

The component may be a fully formed shoe upper. "Fully formed" in this context means that the upper comprises its final three-dimensional shape. The usual steps of shaping a two-dimensional upper into a three-dimensional shape, e.g. by gluing, welding or sewing may be omitted.

The step of providing the sheet of material may comprise fixing the sheet of material in a frame. Thus, the sheet of material may be firmly held in place when the last is moved into the sheet.

The sheet of material may be fixed in the frame essentially without tension. Thus, any stretching of the sheet is due to the last which is moved into the sheet. In this way, the sheet may optimally conform to the shape of the last. Alternatively, the material may be fastened by loose fixation or with slight tension.

The step of stretching the heated sheet of material may comprise decreasing the distance between the frame and the last. Thus, in the context of the present invention, moving the last into the sheet may comprise moving the last towards the sheet, moving the sheet towards the last, or a combination of both movements.

The last may be secured to a vacuum plate. Thus, the vacuum plate may create a vacuum between the sheet of material and the last, so that the sheet is optimally conformed to the shape of the last.

Alternatively, or additionally, the last may be adapted to create a vacuum between the sheet of material and the last. For example, the last may comprise a porous material and/or may comprise a plurality of holes to allow the evacuation of air between the last and the sheet of material. To this end, the last may be connected to a vacuum source or pump.

The method may be performed in a heating chamber. In this way, heat may be uniformly applied to the sheet of material which may further reduce the formation of wrinkles. Alternatively, the material may be heated, e.g. in a heating chamber or on a heater, and then moved to a vacuum former where it is stretched and where pressure is applied.

The step of stretching the heated sheet of material may comprise stretching at least a portion of the sheet of material by about 30%. The inventors have realized, that this amount of stretching allows the component to form around the last without failure and allows the component, in particular a fully formed shoe upper, to hold its new shape. Furthermore, at this amount of stretch, the material may be brought under the last without cracks.

The portion of the sheet of material to be stretched by about 30% may be located in peripheral areas of a shoe upper. For example, the heel portion of a shoe upper may be stretched by about 30%.

In general, the stretching of the heated sheet of material may vary depending on location and/or material used.

The step of stretching the heated sheet of material comprises controlling the stretch during stretching. In this way, the sheet may be provided with the optimal stretch before it is conformed to the last by the vacuum. Thus, uneven stretching of the sheet may be avoided.

The method may further comprise the step of cooling down the component. Thus, the component may be permanently conformed to the three-dimensional shape of the component.

The component may be a portion of an upper for a shoe. In particular, the component may essentially be the entire upper of a shoe. "Essentially" in this context means except for additional components like reinforcements (e.g. heel counter and toe cap), laces, logos, etc. However, in some embodiments, the method according to the invention avoids any added components like collar binding or tongue. Thus, a three-dimensional upper may be formed by the method of the present invention in one process step in an automated process. The desirable combination of method steps avoids or at least reduces the formation of wrinkles.

The method may further comprise the step of placing an insole board below the last. Thus, the insole board may be directly integrated with the component. An additional step of joining the insole board to the component may be omitted which saves process time and costs. For example, the component may essentially be an entire upper as described above, and the insole board may directly be integrated into the upper while forming the upper in its three-dimensional shape.

The insole board may be placed below the last before the step of stretching the heated sheet of material. Thus, when conforming the sheet to the last, the insole board is arranged inside the resulting upper, i.e. in its correct position.

The method may further comprise the step of bonding the insole board to the portion of the upper. Thus, the insole board may be permanently fixed to the portion of the upper while forming the portion of the upper. An additional, separate step of attaching the insole board may be omitted thereby saving manufacturing time and costs.

The method may further comprise the steps of applying an adhesive to the insole board and bonding the insole board to the portion of the upper. Adhesives are easy to handle and allow for a firm and durable connection between the insole board and the portion of the upper.

The method may further comprise the step of clamping the insole board and the portion of the upper between the last and the vacuum plate. This allows for the exertion of pressure to the insole board and the portion of the upper in order to join both parts. This is especially beneficial when using an adhesive, which often requires the application of pressure to achieve a firm bond. The pressure may be generated by the vacuum, such that no additional pressure source is needed.

The method may further comprise the step of removing excess material from the component by using a heated cable, an oscillating knife or a laser. Thus, any remaining material which shall not be part of the final component is removed. In some embodiments, this is done while the component is still on the last, so that the component is fixed with respect to the cable, knife or laser.

The method may further comprise the step of forming at least one aperture in the component to remove the last. Beneficially, this aperture forms an opening of the final component. For example, when forming a portion of an upper or essentially an entire upper, the aperture may be the throat opening.

The method may further comprise the step of deconstructing the last to fit through the aperture. In this way, the aperture may be smaller than the fully deployed last.

The step of applying a pressure higher than ambient pressure over the stretched sheet of material may be performed without a mat or membrane applied over the stretched sheet of material. In this way, additional machine components and method steps may be omitted.

Pressure higher than ambient pressure may be applied over the stretched sheet of material by gas or steam. Thus, the pressure may be uniformly applied over the sheet of material which helps to uniformly conform the sheet to the last.

The gas or steam may come into contact with the stretched sheet of material. Thus, an additional mat or membrane may be avoided as the gas or steam may directly exert pressure and heat onto the sheet.

The method may further comprise the step of heating the gas or steam. In this way, the sheet of material gets softer and may better conform to the last.

The step of applying a pressure higher than ambient pressure over the stretched sheet of material may include inflating at least one bladder such that it comes into contact with at least a portion of the stretched sheet of material. In this way, the sheet may additionally or alternatively be conformed to the last.

Another aspect of the present invention relates to a component for a shoe being manufactured according to the method as described herein. The component may be a portion of an upper for a shoe.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Exemplary embodiments of a method according to the invention will now be described with respect to the illustrations of FIGS. 1A and 1B. Generally, the method according to the invention is suitable to manufacture entire shoe uppers as well as parts thereof, such as toe caps, heel counters, vamp portions, reinforcements, etc. The method may also be used to manufacture sole structures, such as outsoles, midsoles and insoles as well as parts thereof.

According to the inventive method, a sheet of material is provided in a first step. In FIGS. 1A and 1B, such a sheet is denoted with the reference numeral 11. A sheet in this context is understood as an object having a thickness which is smaller than its length and width. Usually, the thickness of a sheet is substantially smaller than its length and width. It should be noted that in the context of the present invention, the sheet 11 may have an arbitrary shape, i.e. rectangular, quadratic, circular, elliptical, etc.

The sheet 11 is made from material which is suitable to be formed when heated. Exemplary materials include polyurethane (PU) synthetic, polyester and thermoplastic polyurethane (TPU). In some embodiments, the sheet 11 is a PU synthetic or a textile material, i.e. is made from fibers, such as a woven, non-woven, weft knit, warp knit, etc. However, in certain embodiments, non-textile materials such as a plastic sheet, film, etc. may be used. The sheet 11 may also comprise a coating of a material which may be formed when heated.

The following table presents different options of materials to use for the sheet 11. The table shows the material type in column 2, a short material description in column 3, the stretch under a load of 100 N in column 4, the optimal molding time in column 5, the optimal heating time in column 6 and the working temperature in the last column.

| Material Group | Material Type | Material description | Stretch under load 100N | Molding time in sec | Heating time in sec | Working temp in ° C. |
|---|---|---|---|---|---|---|
| #1 | PU coated synthetic with stretch function non-woven, or non-woven microfiber, with or without a TPU film in between the layers | Stretchable (by-hand) made out of non-stretch polyester or nylon or mixture between both fibers, needled felt, made stretchy by manufacturing process of non-woven. With a PU resin of 0.1 to 1.0 mm. Stretchable in 1, 2 or 3 directions | 10-30% | 60 sec. | 60-80 sec. | 140-180° C. |
| #2 | PU synthetic non-woven or non-woven microfiber without stretch function with or without a TPU film in between the two layers | Non-stretchable (by hand) non-woven backed PU resins. 0.1 to 1.0 mm pu thickness | 10-20% | 60 sec. | 60-80 sec. | 140-180° C. |
| #3 | TPU films laminated or coated to textile stretch or non-stretch, stretch in 1, 2 or 3 ways | TPU films with the thickness of 0.1 mm to 2 mm laminated with circular or weft knitted distance meshes (thickness of 1 mm to 2 mm) with an overall thickness of 2-7 mm. No matter which way of lamination or if the TPU is coated | 20-40% | 40 sec. | 60-80 sec. | 120-170° C. |
| #4 | PU coated knitwear | Stretch knit polyester or nylon or mixture with a spandex content coated with a PU resin called stretch PU synthetic, with PU, PU Hotmelt, or TPU as top layer. The description is also valid for knitwear backed PU resins without being able to be stretched by hand | 30-60% | 40-60 sec. | 60-80 sec. | 120-160° C. |

-continued

| Material Group | Material Type | Material description | Stretch under load 100N | Molding time in sec | Heating time in sec | Working temp in ° C. |
|---|---|---|---|---|---|---|
| #5 | Stretch textile without spandex | Circular knit without spandex but with stretch in 1, 2 or 3 ways, with or without a coating or laminated addition | 20-40% | 60-80 sec. | 60-80 sec. | 150-190° C. |
| #6 | Stretch textile with spandex | Warp or circular knit or woven with spandex content and stretch in 1, 2 or 3 ways | 40-70% | 60-80 sec. | 60-80 sec. | 150-180° C. |
| #7 | Textile | Warp knit without spandex content without stretch, as well as woven or weft knit. | 30-50% | 60-80 sec. | 80-120 sec. | 170-220° C. |
| #8 | Textile with TPU yarns | Circular jaquard knit with TPU yarns with a melting point above 80° C., or warp knit or any other type of knit, stretchable by hand | 20-90% | 40-60 sec. | 60-100 sec. | 150-200° C. |
| #9 | Textile with adhesive TPU yarns | Circular jaquard knit or flat knit polyester - adhesive yarn with PES or PA combination for creating the strand. With a melting point of 80° C. and above | 40-90% | 40-60 sec. | 60-100 sec. | 120-180° C. |
| #10 | Textile with low melting point polyester yarns | Flat knit with special co-polyester yarns with a low melting point of 80° C. plus | 20-50% | 40-60 sec. | 60-80 sec. | 130-190° C. |
| #11 | TPU film without any backing | | 70-100% | 30-40 sec. | 40-60 sec. | 100-120° C. |

Figure 1B:
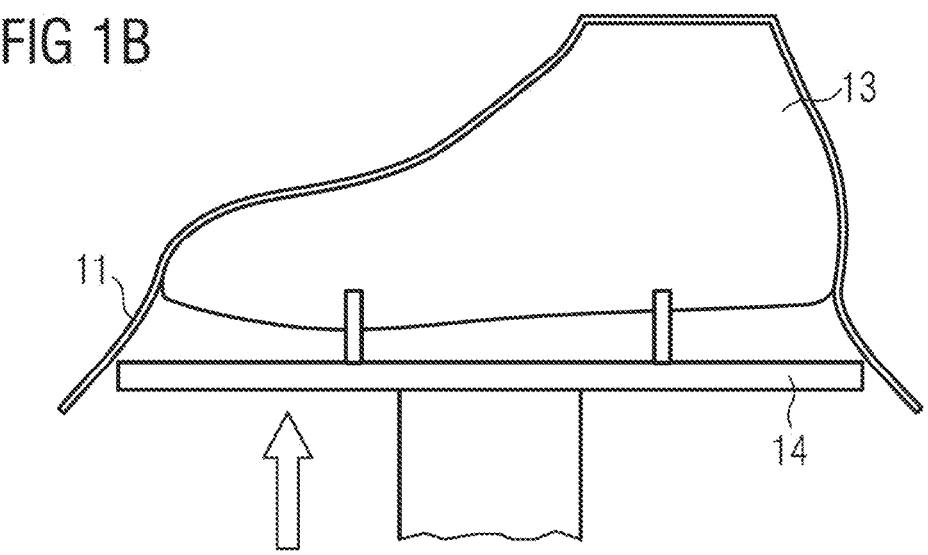

In some embodiments, the sheet of material 11 is held static in a frame or similar construction (not shown in the illustration of FIGS. 1A and 1B). Furthermore, in certain embodiments the sheet 11 is held without tension, but may be fastened by loose fixation or with slight tension.

In a next step of the inventive method, the sheet of material 11 is heated. As illustrated in FIG. 1A, heat may be provided by heating lamps 12 which radiate a substantial amount of infrared radiation onto the sheet 11, such that the temperature of the sheet 11 increases. However, other heating sources could be used as well. For example, the sheet of material 11 could be placed in a heating chamber or heat could be provided by heat conduction, e.g. from a heating wire or similar heating device. In some embodiments, the sides of a heating chamber are ceramic and heated. Furthermore, while in FIG. 1A both sides of the material sheet 11 are heated, only a single side could be heated in other embodiments.

The heat may be adjusted to selectively affect properties of the material to adjust a portion of the upper. For example, the heat may be adjusted to make the material more pliable to achieve a stable, yet permanent deformation after the stretching step.

Typically, materials are heated to 120°-160° C. for about 60 seconds, but generally, materials may be heated to higher temperatures for different time periods. For example, a non-woven sheet of material with a polyurethane coating may be heated to 200° C. for 40 seconds. It is important to heat up the material to a so called "gel value" which allows a deformation in subsequent steps and a subsequent maintaining of the final, desired shape of the component after cooling.

In a next step of the inventive method, the heated sheet of material 11 is stretched by moving a last 13 into the sheet of material 11 as illustrated in FIG. 1B by the arrow. Generally, the last 13 defines the shape of the final component. Thus, in the example of FIGS. 1A and 1B the last 13 has the shape of a foot. Accordingly, the resulting component will be an entire shoe upper. However, as explained above, a variety of different components for a shoe may be manufactured with the inventive method. Therefore, the shape of the last 13 may generally vary.

As illustrated in FIG. 1B, the sheet 11 stretches when the last 13 is moved into the sheet 11. Thus, the sheet 11 already conforms to some extent to the shape of the last 13. The sheet of material 11 may stretch by 30%. Generally, the stretch may vary across the sheet 11. For example, the areas of the sheet 11 which first contact the last may be stretched more than other areas.

In the next step, a pressure lower than ambient pressure is applied between the stretched sheet of material and the last to conform the sheet of material to the last. In the example of FIGS. 1A and 1B, the last 13 is secured on a vacuum plate 14. The vacuum plate 14 comprises holes (not shown in the illustration of FIGS. 1A and 1B) which are connected to a vacuum source (not shown in the illustration of FIGS. 1A and 1B). Thus, a lower pressure compared to ambient pressure is generated between the last 13 and the sheet 11 conforming the sheet 11 to the last 13.

In some embodiments, the last 13 comprises holes which are connected to a vacuum source. In this case, the last 13 need not be secured to a vacuum plate.

After the material is heated and formed by the vacuum, it is cooled down to a temperature between −10° and 5° C. However, different temperatures may generally be used. This cooling step fixates the formed component.

Figure 2:
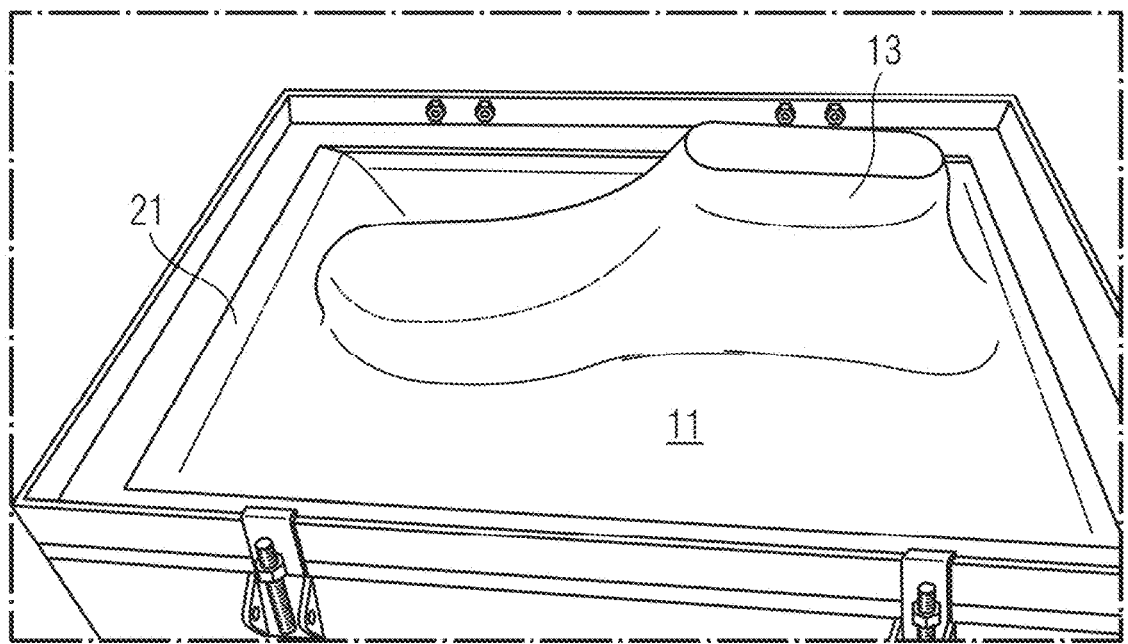
FIG. 2 is a perspective view of a sheet of material conformed to a last by a vacuum according to certain embodiments of the present invention.

FIG. 2 shows an example of a sheet of material 11 conformed to a last 13 by a vacuum according to the method of the invention. As may be seen in this example, the sheet 11 may be held in a frame 21. The frame 21 helps to hold the sheet 11 static without tension before the sheet 11 is stretched. It also absorbs the tension forces which result in the sheet 11 when the sheet 11 is stretched.

Figure 3A:
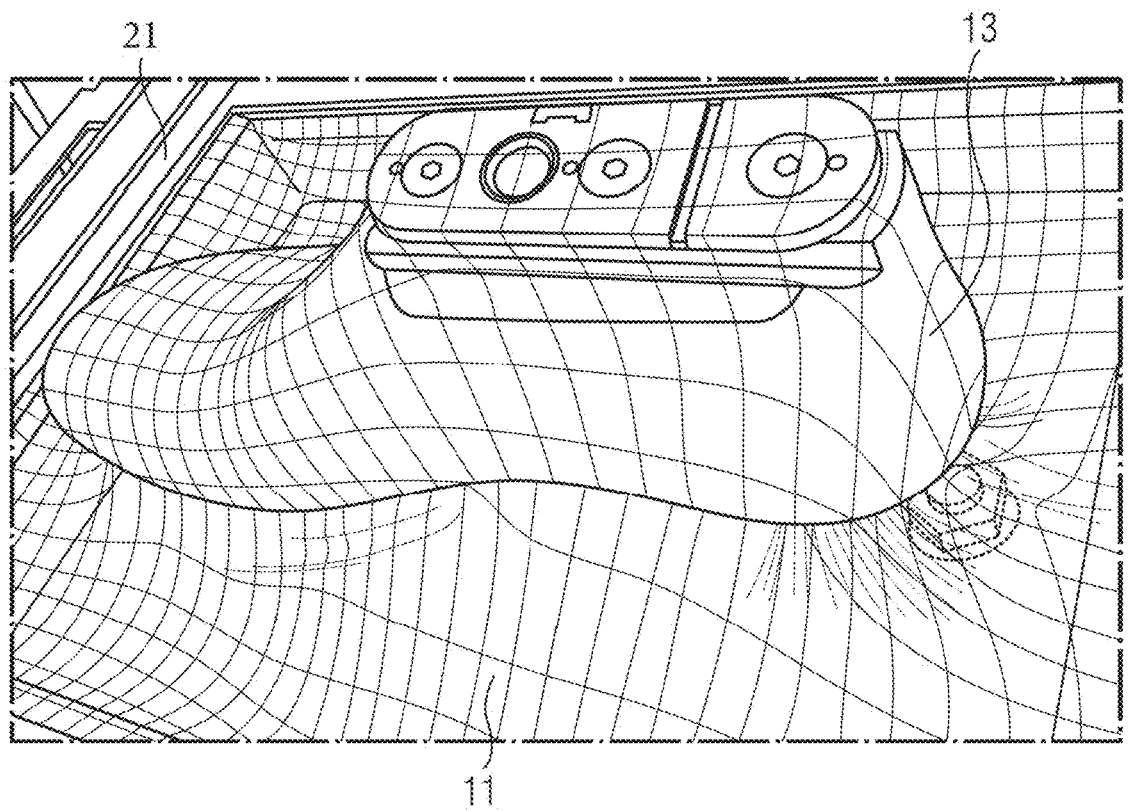
FIG. 3A is a top perspective view of a sheet conformed to a last by a vacuum and the different amounts of stretch in the sheet according to certain embodiments of the present invention.
Figure 3B:
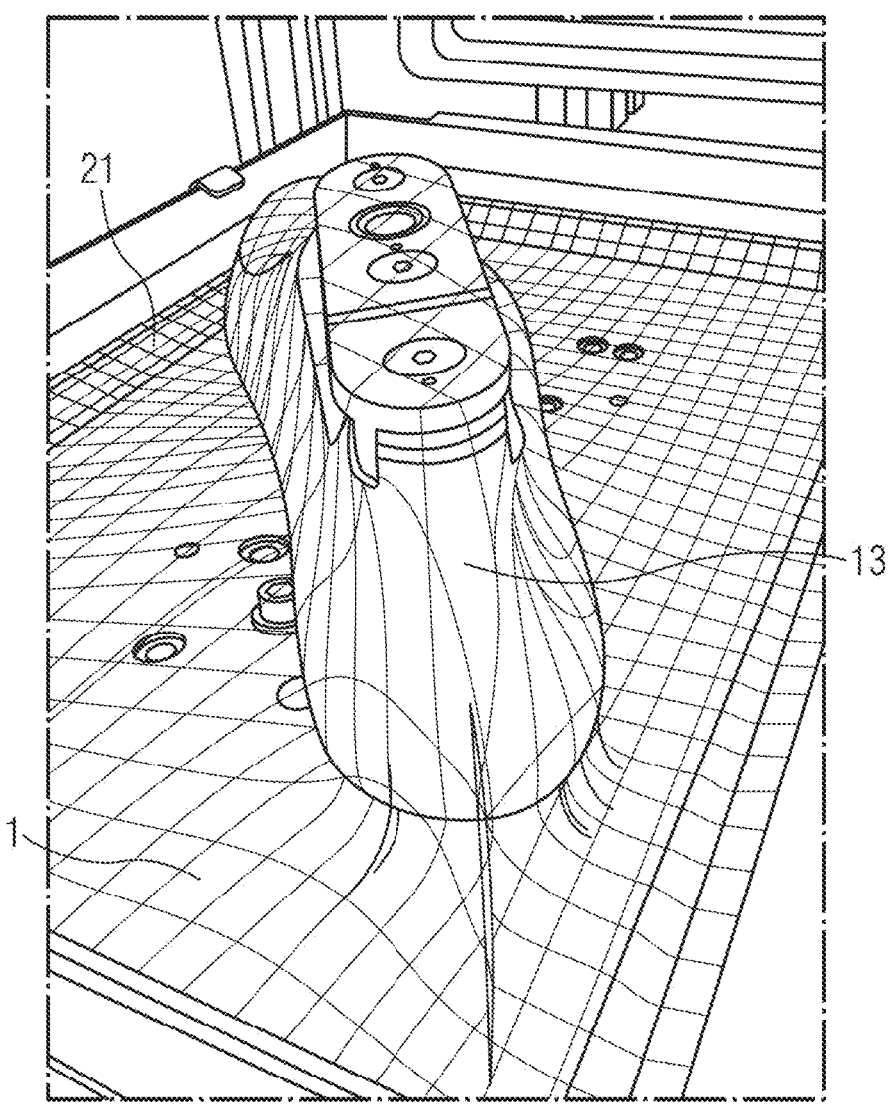
FIG. 3B is a rear perspective view of the sheet of FIG. 3A.

FIGS. 3A and 3B show another example of a sheet 11 conformed to a last 13 by a vacuum. FIGS. 3A and 3B primarily show the distribution of stretch in the sheet of material 11. In FIG. 3A the last 13 is positioned along a longitudinal axis of the vacuum plate and the frame 21. In FIG. 3B the last 13 is positioned diagonally relative to the vacuum plate and the frame 21. Generally, the position of the last in the frame might influence the material consumption and the size of the frame. An oval placed last may give more material allowance in the heel, where based on the last shape more stretch is required.

The stretch achieved in the embodiments of FIGS. 3A and 3B for a PU coated synthetic is as follows: The heel area and the top of the last 13 serve as a reference for calculating stretch. The heel area is the most critical area, where 30% stretch is achieved. In the toe area of the shoe, the stretch achieved is less than 10%. In the middle portions of the shoe, the stretch achieved is around 20%. If an adequate stretch is not achieved in the heel area, in this case 30%, wrinkles form in the material.

Figure 4A:
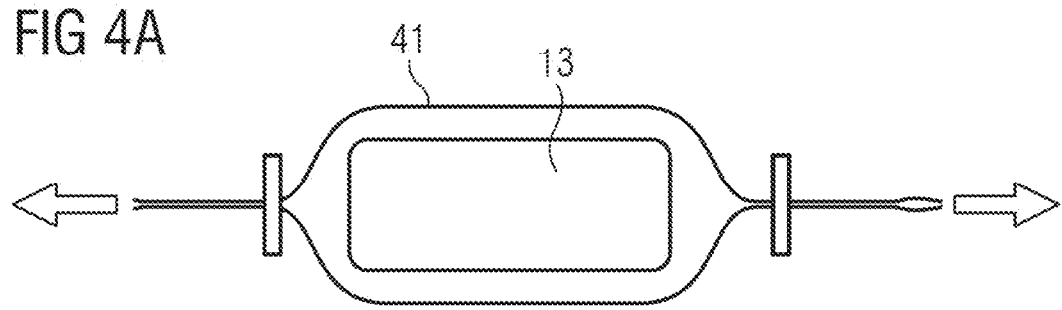
FIGS. 4A and 4B are diagrams illustrating a method of removing excess material from a component according to certain embodiments of the present invention.
Figure 4B:
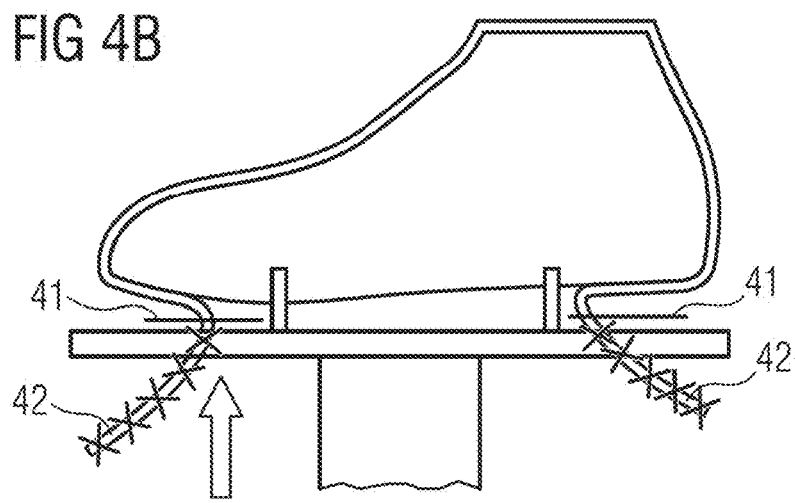

After forming the component on the last, excess material may be removed as illustrated in FIGS. 4A and 4B. FIG. 4A illustrates the general principle in a top view. A loop of a heated cable 41 is placed below the last 13 and the cable 41 is pulled as illustrated by the arrows. In this way, the loop 41 decreases in size and finally contacts the excess material 42 which melts due to the heat and separates from the component as illustrated in FIG. 4B.

Alternatively, the excess material 42 may be removed by an oscillating knife or a laser that cuts the excess material from underneath the last 13.

In some embodiments of the present invention, after the sheet 11 is conformed to the shape of the last 13, the resulting upper component may be secured to an insole board (not shown in the Figures). The insole board may already be in place below the last 13 at the beginning of the manufacturing process. On the insole board a certain kind of adhesive is applied, either manually, per robot or pre-applied. For example, a cold cement (e.g. a hotmelt) may be pre-applied such that when the material is wrapped underneath the last, the material is bonded to the insole board.

Depending on the material used for the sheet 11, the material may already begin to wrap around the bottom of the last 13 as may be seen in FIGS. 2, 3A and 3B. This wrapping effect, however, may not be enough to fully attach the material to the cement on the insole board. The attaching of the upper material to the insole board can be done with different methods ranging from a traditional board lasting method to a process where a heated cable is used to pull the material under the last and secure it to the cold cement on the insole board. This heated cable may be the same cable that cuts the excess material as described above. The vacuum plate 14 may have a pressure potential of e.g. 10 bar and may be used to bond the upper material to the insole board. Alternatively or additionally, the upper material may be pressed against the insole board by a punch or similar method.

Figure 5:
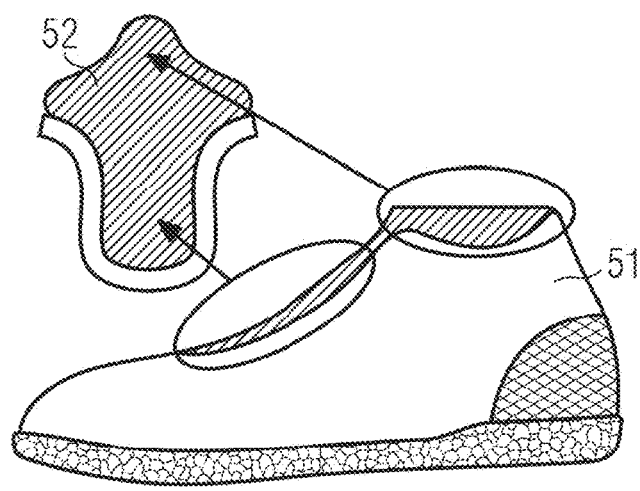
FIG. 5 is an exploded view of a further optional step of the method according to certain embodiments of the present invention.

FIG. 5 illustrates a further optional step of the method according to certain embodiments of the invention which is applicable when manufacturing an upper 51 or a part thereof. In this step, the last 13 which is still inside the upper 51 is removed. Thus, the step-in or throat opening of the upper is cut open and the corresponding material 52 is removed to finalize the manufacture of the upper 51 and to allow last removal. The last 13 is then deconstructed in order to allow its removal from the upper.

Figure 6:
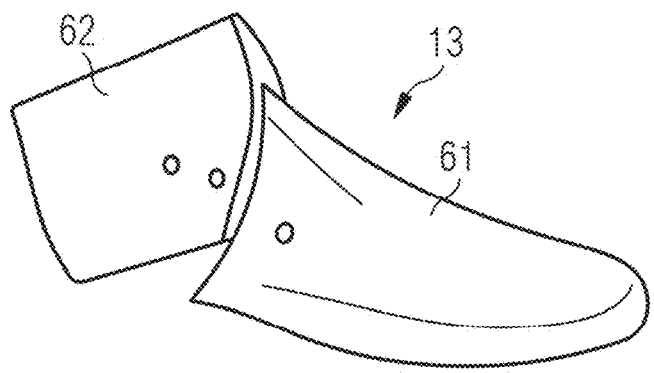
FIG. 6 is a perspective view of an exemplary last which is suitable for the method according to certain embodiments of the present invention.

An exemplary last 13 which is suitable for the method according to certain embodiments of the invention is shown in FIG. 6. As may be seen, the last 13 is made from two parts, namely a front part 61 and a back part 62 which are connected by a joint to allow rotating both parts relative to each other. Thus, the last 13 may be folded while still inside the upper 51 to allow for an easy removal through the throat opening of the upper 51.

Figure 7A:
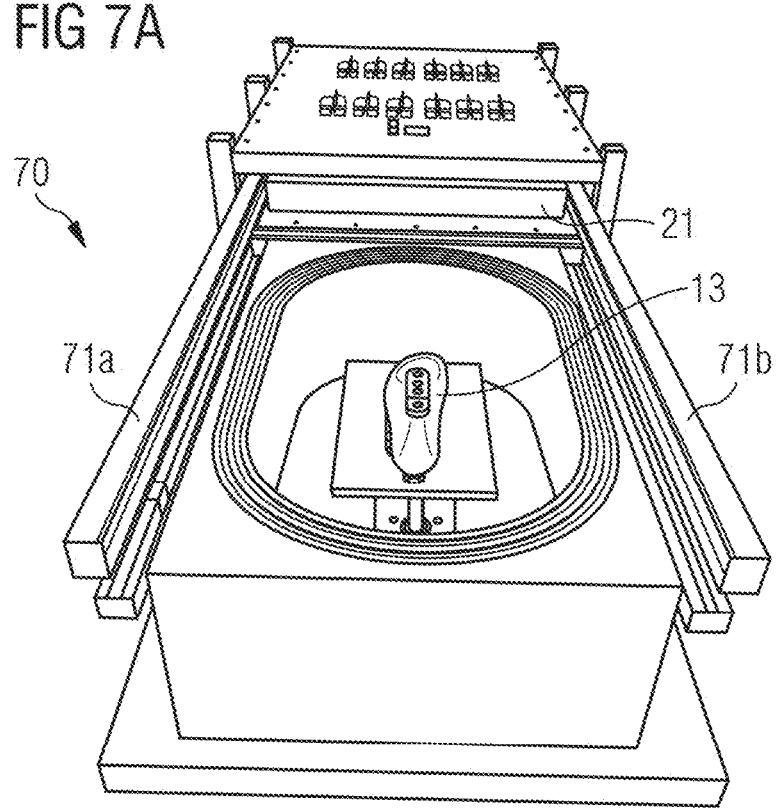
FIGS. 7A, 7B, and 7C are diagrams illustrating an apparatus which may be used according to certain embodiments of the present invention.
Figure 7B:
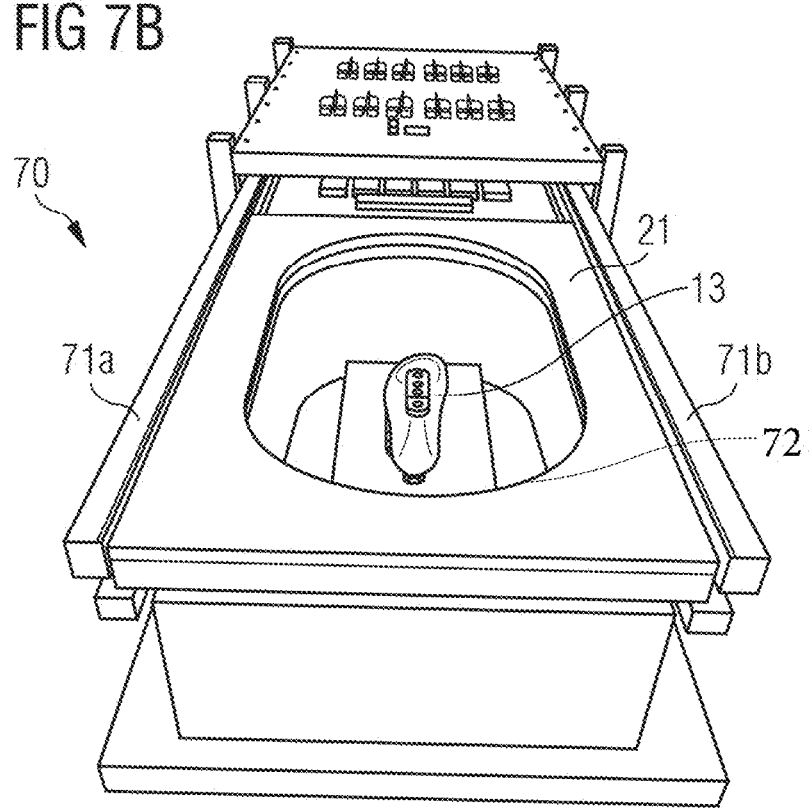
Figure 7C:
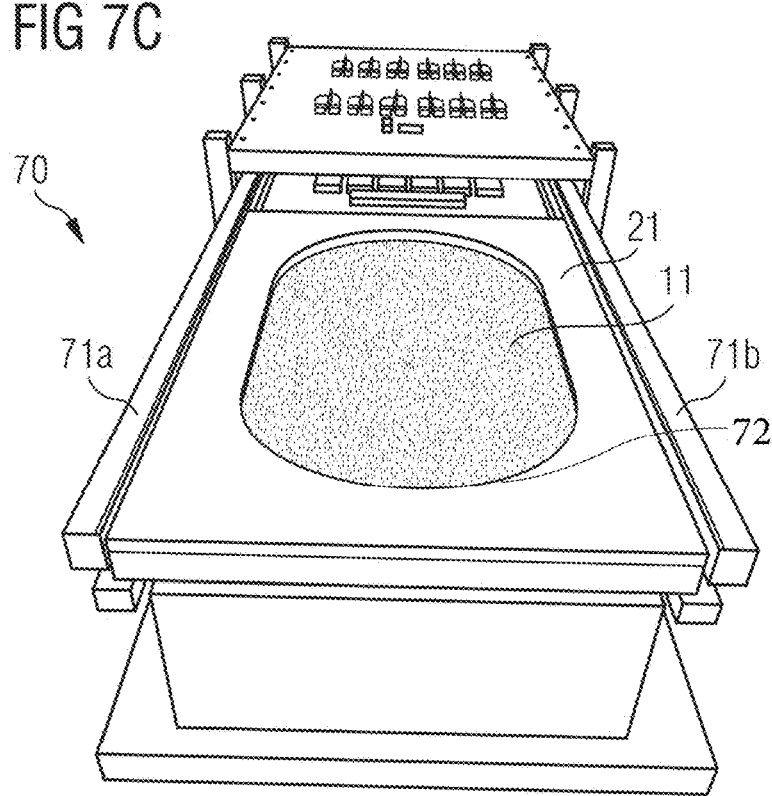

FIGS. 7A, 7B an 7C show an apparatus 70 which may be used in the context of the present invention. As may best be seen in FIG. 7B, the apparatus comprises a frame 21 which is slideable along guide rails 71a and 71b. The frame 21 comprises an oval cutout 72 in which a sheet of material 11 may be fixed as shown in FIG. 7C. The inventors have found that this oval shape optimizes material usage and material stretch.

Based on the configuration of the frame 21, the sheet of material 11 may be placed over a last 13 to perform the method steps as described above in detail, i.e. heat the sheet of material 11, stretch the heated sheet of material 11 by moving the last 13 into the sheet of material 11, and apply a pressure lower than ambient pressure between the stretched sheet of material 11 and the last 13 to conform the sheet of material 11 to the last 13.

Figure 8A:
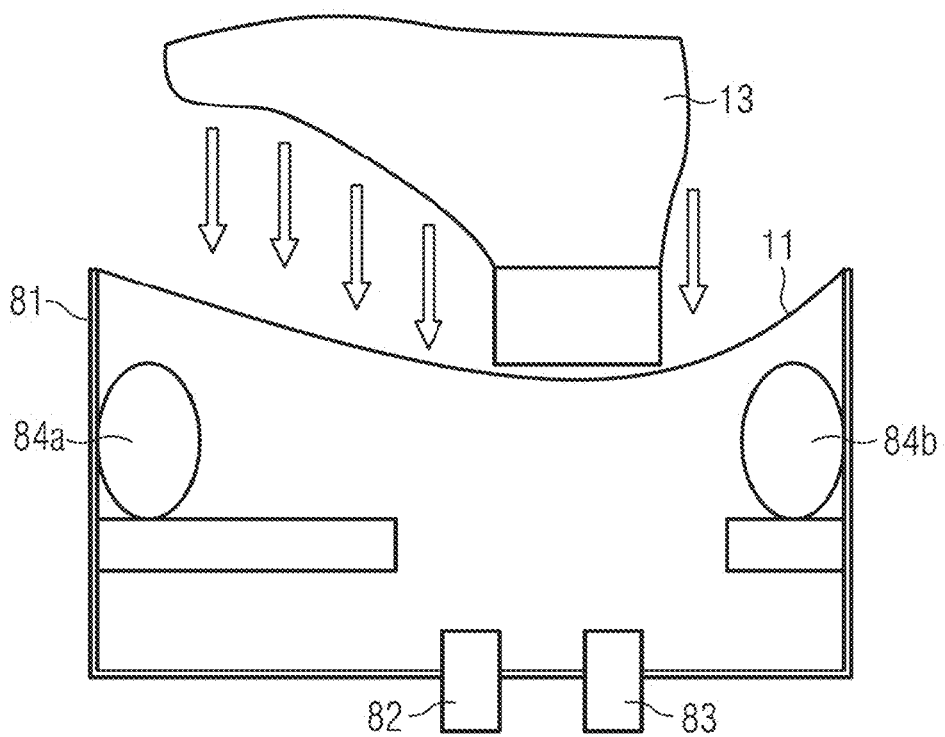

FIGS. 8A, 8B and 8C show exemplary embodiments according to the alternative of the present invention in which a pressure higher than ambient pressure is applied over a stretched sheet of material 11 to conform the sheet of material to a last 13.

As shown in FIG. 8A, a last 13 is moved into a sheet of material 11 which is fixed in an opening of a chamber 81. The chamber 81 may be pressurized by pressure higher than ambient pressure, so that pressure higher than ambient pressure is applied over the sheet of material 13. To this end, the chamber 81 comprises a first valve 82. In exemplary embodiments, pressurized steam between 150° and 200°, for example at 185° C., with a pressure of between 4 to 6 bar, for example at 5 bar, is passed into the chamber 81 via the first valve 82. The steam is provided by a steam raising unit, but other steam sources could be used as well.

The chamber also comprises a second valve 83 which may be used to apply additional heat. For example, additional heat may be provided by a conventional hot air blower to raise the heat about 200° C. In exemplary embodiments, additional heat of between 200°-300° C. is applied via the valve 83.

In the exemplary embodiments of FIGS. 8A, 8B and 8C, the chamber 81 also comprises two bladders 84a and 84b, which may be inflated to apply additional pressure to the sheet of material 11. In FIG. 8A, these bladders are shown in a deflated state, while in FIGS. 8B and 8C, the bladders are shown in an inflated state.

As shown in FIG. 8C by the arrows, the edges of the sheet of material can additionally be folded to conform the sheet of material 11 to the last 13 at the peripheral edges. To this end, rods 85a and 85b push the excess material over the bottom of the last 13 to close the material over the last 13. Furthermore, a gripper or robot arm 86 may be used to handle the last 13.

In the following, further examples are described to facilitate the understanding of the invention:

EXAMPLE 1

Method of Manufacturing a Component for a Shoe Comprising the Steps providing a sheet of material (11);

heating the sheet of material (11);

stretching the heated sheet of material (11) by moving a last (13) into the sheet of material (11), the last (13) defines the shape of the component; and applying a pressure lower than ambient pressure between the stretched sheet of material (11) and the last (13) to conform the sheet of material (11) to the last (13); or applying a pressure higher than ambient pressure over the stretched sheet of material (11) to conform the sheet of material (11) to the last (13).

EXAMPLE 2

Method According to the Preceding Example, Wherein the Component is a Fully Formed Shoe Upper

EXAMPLE 3

Method According to One of the Preceding Examples, Wherein the Step of Providing the Sheet of Material (11) Comprises Fixing the Sheet of Material (11) in a Frame (21)

EXAMPLE 4

Method According to the Preceding Example, Wherein the Sheet of Material is Fixed in the Frame (21) Essentially without Tension

EXAMPLE 5

Method According to One of Examples 3 to 4, Wherein the Step of Stretching the Heated Sheet of Material (11) Comprises Decreasing the Distance Between the Frame (21) and the Last (13)

EXAMPLE 6

Method According to One of the Preceding Examples, Wherein the Last (13) is Secured to a Vacuum Plate (14)

EXAMPLE 7

Method According to One of the Preceding Examples, Wherein the Method is Performed in a Heating Chamber

EXAMPLE 8

Method According to One of the Preceding Examples, Wherein the Step of Stretching the Heated Sheet of Material (11) Comprises Stretching at Least of Portion of the Sheet of Material (11) by About 30%

EXAMPLE 9

Method According to One of the Preceding Examples, Wherein the Step of Stretching the Heated Sheet of Material (11) Comprises Controlling the Stretch During Stretching

EXAMPLE 10

Method According to One of the Preceding Examples, Further Comprising the Step of Cooling Down the Component

EXAMPLE 11

Method According to One of the Preceding Examples, Wherein the Component is a Portion of an Upper for a Shoe

EXAMPLE 12

Method According to the Preceding Example, Further Comprising the Step of Placing an Insole Board Below the Last (13)

EXAMPLE 13

Method According to the Preceding Example, Wherein the Insole Board is Placed Below the Last Before the Step of Stretching the Heated Sheet of Material (11)

EXAMPLE 14

Method According to One of Examples 12 To 13, Further Comprising the Step of Bonding the Insole Board to the Portion of the Upper

EXAMPLE 15

Method According to the Preceding Example, Further Comprising the Steps of Applying an Adhesive to the Insole Board and Bonding the Insole Board to the Portion of the Upper by Means of the Adhesive

EXAMPLE 16

Method According to Claim 6 and One of Examples 14 To 15, Further Comprising the Step of Clamping the Insole Board and the Portion of the Upper Between the Last and the Vacuum Plate (14)

EXAMPLE 17

Method According to One of the Preceding Examples, Further Comprising the Step of Removing Excess Material from the Component by Using a Heated Cable, an Oscillating Knife or a Laser

EXAMPLE 18

Method According to One of the Preceding Examples, Further Comprising the Step of Forming at Least One Aperture in the Component to Remove the Last

EXAMPLE 19

Method According to the Preceding Example, Further Comprising the Step of Deconstructing the Last (13) to Fit Through the Aperture

EXAMPLE 20

Method According to One of the Preceding Examples, Wherein the Step of Applying a Pressure Higher than Ambient Pressure Over the Stretched Sheet of Material (11) is Performed without a Mat or Membrane Applied Over the Stretched Sheet of Material (11)

EXAMPLE 21

Method According to One of the Preceding Examples, Wherein Pressure Higher than Ambient Pressure is Applied Over the Stretched Sheet of Material (11) by a Gas

EXAMPLE 22

Method According to the Preceding Example, Wherein the Gas Comes into Contact with the Stretched Sheet of Material (11)

EXAMPLE 23

Method According to One of Examples 21 or 22, Further Comprising the Step of Heating the Gas

EXAMPLE 24

Method According to One of the Preceding Examples, Wherein the Step of Applying a Pressure Higher than Ambient Pressure Over the Stretched Sheet of Material (11) Includes Inflating at Least One Bladder (84a, 84b) Such that it Comes into Contact with at Least a Portion of the Stretched Sheet of Material (11)

EXAMPLE 25

Component for a Shoe Being Manufactured According to One of the Preceding Examples

EXAMPLE 26

Component for a Shoe According to the Preceding Example, Wherein the Component is a Portion of an Upper for a Shoe

EXAMPLE 27

Component for a Shoe According to Example 25, Wherein the Component is a Fully Formed Shoe Upper Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method of manufacturing a component for a shoe comprising:
    heating a sheet of material;
    stretching the heated sheet of material by moving a last into the sheet of material, wherein the last defines a shape of the component;
    applying at least one of a pressure lower than ambient pressure between the stretched sheet of material and the last to conform the sheet of material to the last or a pressure higher than ambient pressure over the stretched sheet of material to conform the sheet of material to the last;
    pulling a loop of a heated cable against a portion of the sheet of material that is wrapped underneath the last so as to pull the sheet of material into bonded securement with an insole board positioned below the last and so as to separate excess material from the component by melting the sheet of material at a point of contact with the heated cable; and
    cutting the stretched sheet of material to form at least one aperture and deconstructing the last to fit through the aperture.

2. The method according to claim 1, wherein the component is a fully formed shoe upper.

3. The method according to claim 1, wherein the stretching the heated sheet of material comprises stretching at least a portion of the sheet of material by about 30%.

4. The method according to claim 1, wherein the stretching the heated sheet of material comprises controlling the stretch during stretching.

5. The method according to claim 1, further comprising cooling down the component.

6. The method according to claim 1, wherein the applying a pressure higher than ambient pressure over the stretched sheet of material comprises inflating at least one bladder such that it comes into contact with at least a portion of the stretched sheet of material.

7. The method according to claim 1, further comprising fixing the sheet of material in a frame prior to heating the sheet of material.

8. The method according to claim 7, wherein the sheet of material is fixed in the frame substantially without tension.

9. The method according to claim 7, wherein the stretching the heated sheet of material comprises decreasing a distance between the frame and the last.

10. The method according to claim 1, wherein the component is a portion of an upper for a shoe.

11. The method according to claim 10, further comprising placing the insole board below the last.

12. The method according to claim 11, wherein the insole board is placed below the last before the stretching the heated sheet of material.

13. The method according to claim 12, further comprising applying an adhesive to the insole board and bonding the insole board to the portion of the upper via the adhesive.

14. The method according to claim 12, further comprising clamping the insole board and the portion of the upper between the last and a vacuum plate.

15. The method according to claim 1, further comprising applying a pressure higher than ambient pressure over the stretched sheet of material by at least one of a heated gas or a non-heated gas.

16. The method according to claim 15, wherein the gas comes into contact with the stretched sheet of material.

\* \* \* \* \*